May 2, 1939.　　　J. R. MORRISON ET AL　　　2,156,303
ROD BAKING EQUIPMENT
Filed June 12, 1937　　　5 Sheets-Sheet 1

INVENTORS
John R. Morrison.
Kenneth B. Lewis.
BY Louis J. McBane.
ATTORNEY.

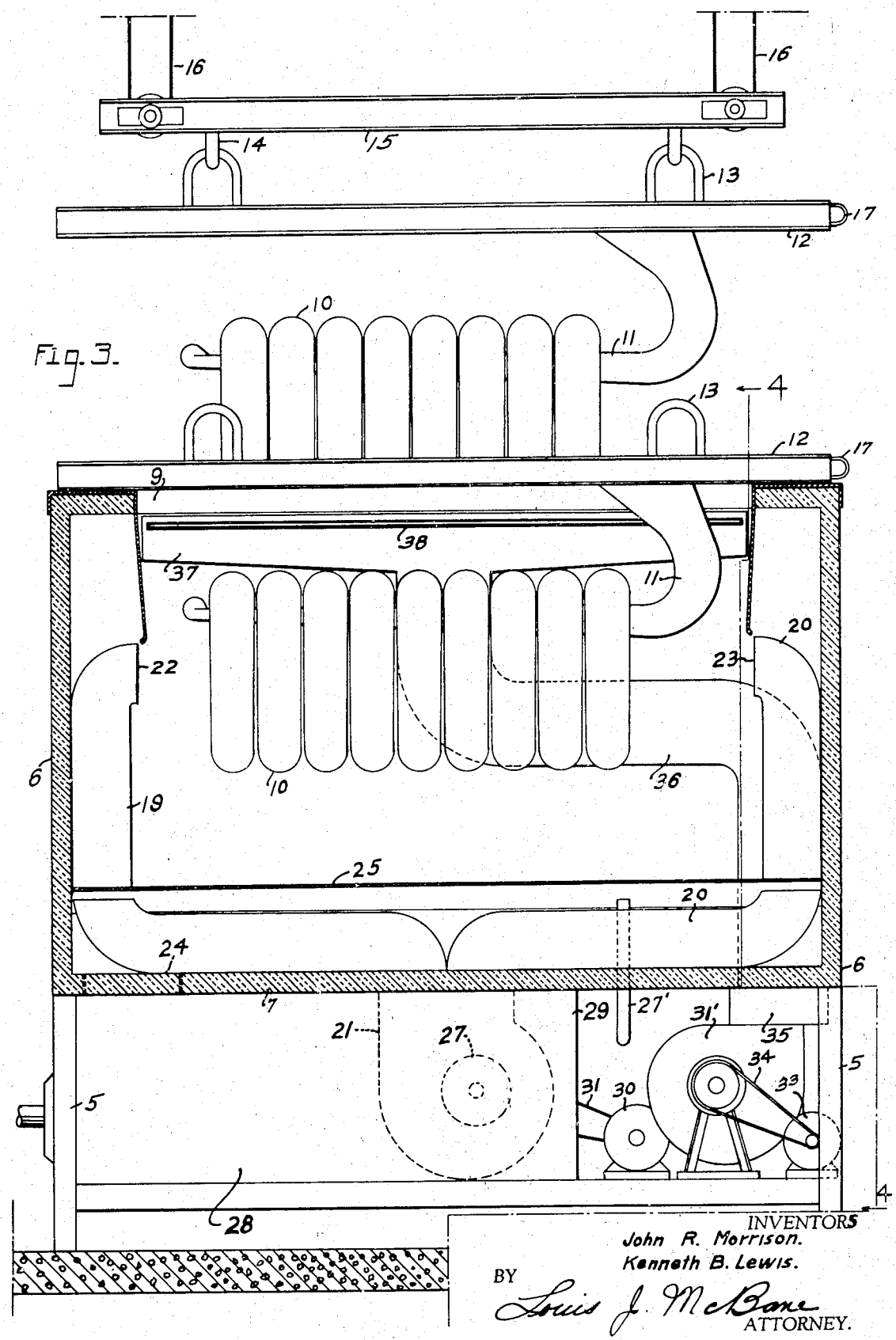

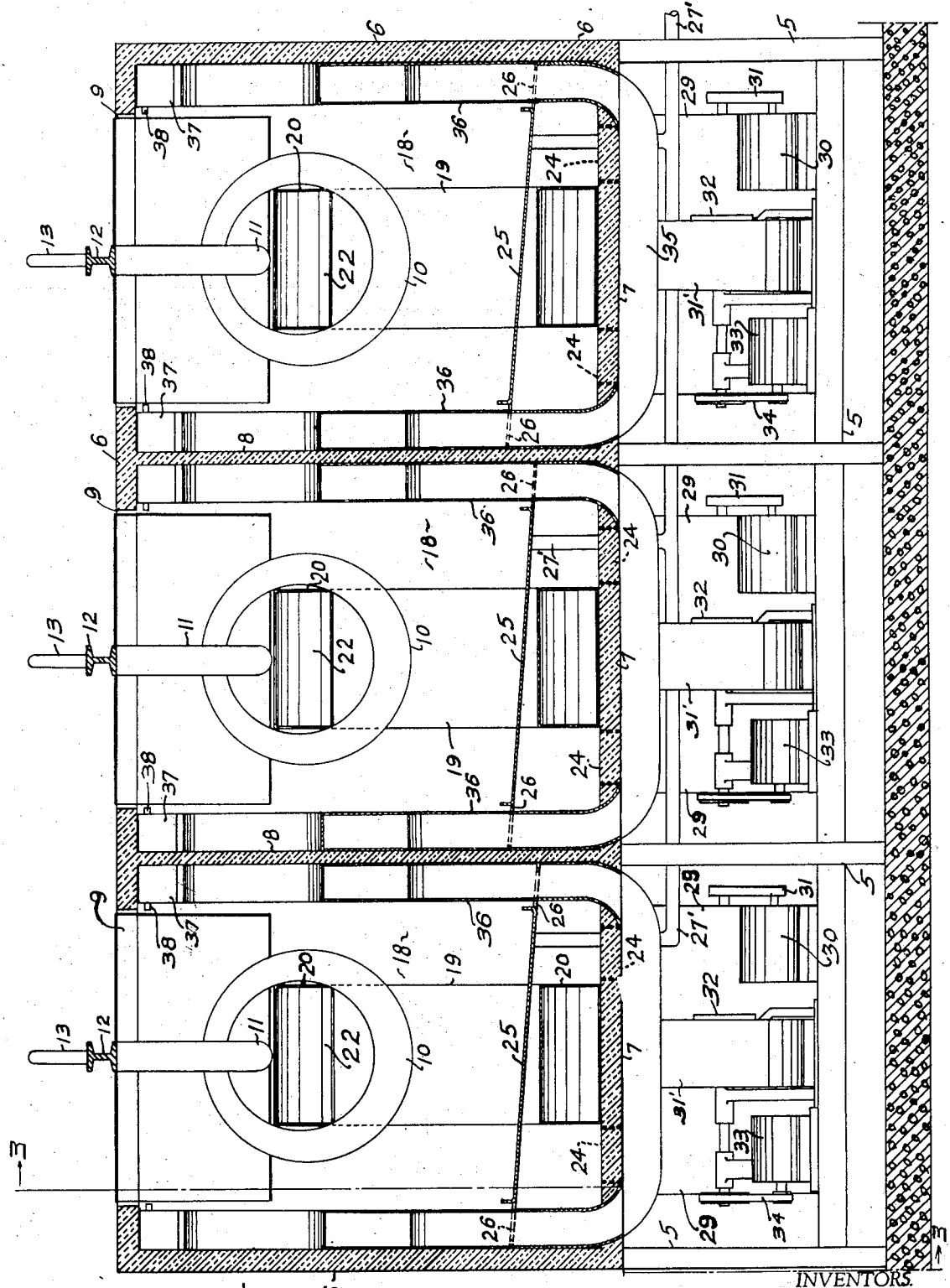

May 2, 1939.  J. R. MORRISON ET AL  2,156,303
ROD BAKING EQUIPMENT
Filed June 12, 1937  5 Sheets-Sheet 5
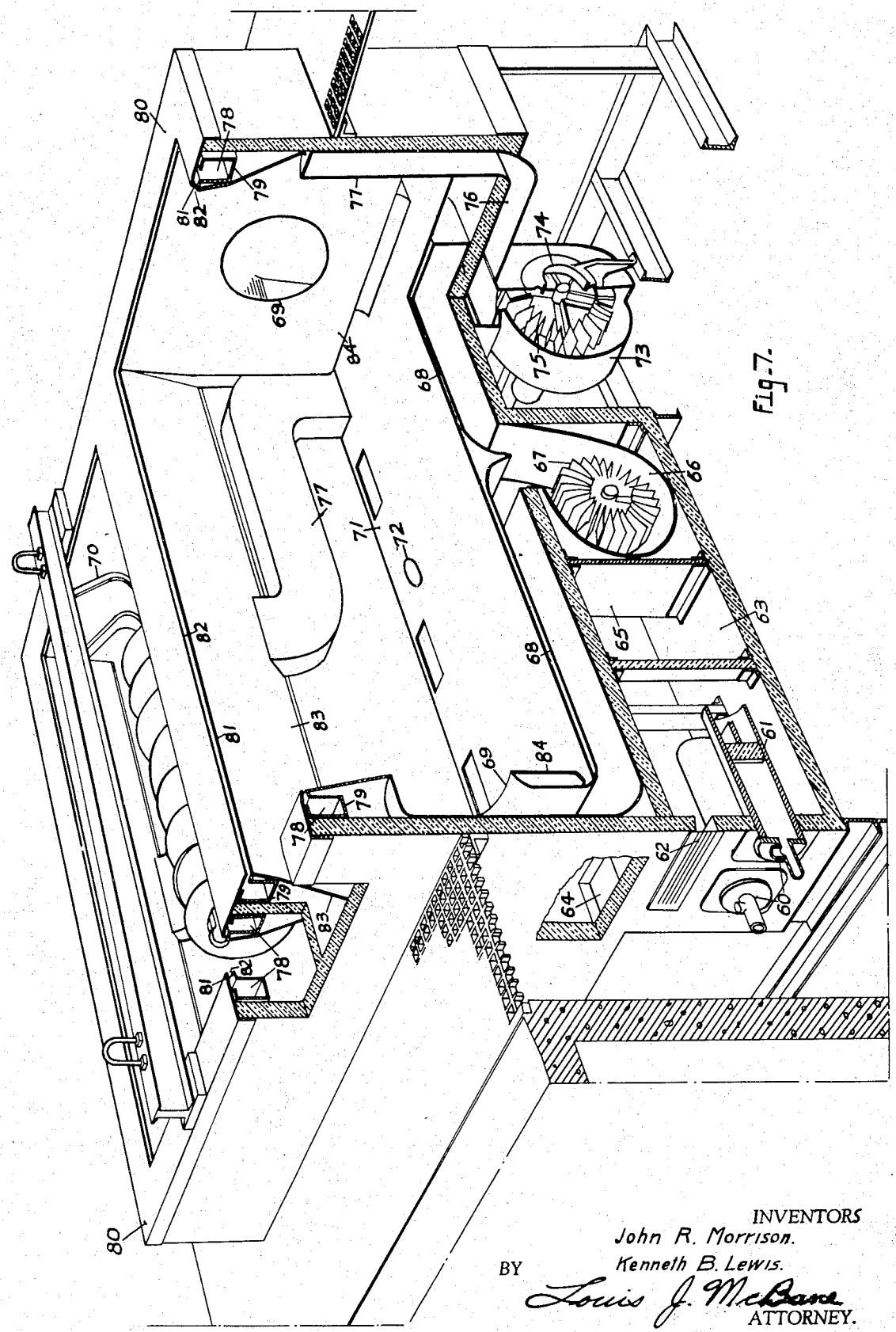
INVENTORS
John R. Morrison.
Kenneth B. Lewis.
BY Louis J. McBane
ATTORNEY.

UNITED STATES PATENT OFFICE 2,156,303

ROD BAKING EQUIPMENT

John R. Morrison, Hudson, Ohio, and Kenneth B. Lewis, Worcester, Mass.

Application June 12, 1937, Serial No. 147,902

12 Claims. (Cl. 34—19)

This invention relates to rod processing.

In the manufacture of products from steel rod, which involve the step of drawing the rod, there are certain operations upon the rod preliminary to the drawing operation. Such operations convert the surface condition of the rod to a condition suitable for passage through drawing dies.

The rods from the rolling mills commonly have scale. The rods, leaving the rolling mills, are coiled and usually are stored in a bank. During storage, red rust may form on the rods. Both the scale and red rust must be removed before drawing the rod.

Drawing technique also requires a film of hydrated oxide of iron and a dry coating of lime on the rod, when the rod passes through the drawing die. The elimination of scale and red rust, the formation of hydrated oxide of iron, coating the rod with lime, and baking the lime and rod, are the essential purposes of the operations which intervene preparatory to the drawing operation.

The coils of rod are brought from a stock to the processing equipment. Several coils of rod are caught on a hook, called a "pin." The pin of rods is lowered into an acid pickle bath where the acid acts to loosen the scale and to eliminate the red rust. The time of immersion usually is about thirty minutes. Then the pin of rods is transferred from the acid bath to a rinse where the acid is washed off. From the rinse, the pin of rods goes to a sull where the rods are subjected to a mist of moisture, to form hydrated iron oxide. Next, the pin of rods is immersed in one or more lime baths. The lime neutralizes any remaining acid and a wet film of lime is deposited on the rods. Lastly, the rods are baked to eliminate the moisture, leaving a dry coat of lime.

The time required at rinse, at sull, and at lime bath is comparable to the time for acid pickling. This makes it practicable to conduct those operations in sequence, in time schedule, on each pin of rods, the pins being transferred from bath to bath by power equipment. Thereby, low cost of processing is attained.

As practiced heretofore, the rod baking operation has required several hours of time, as much as twenty-four to thirty-six hours in some instances. The rods accumulate at the baking operation and power equipment for handling the rods is not used. The rods, from the lime bath, are stacked on cars which are moved, by hand, into large ovens. The investment in ovens and building, the accompanying overhead expense, together with the high cost of handling, render the baking operation unduly expensive.

Certain factors are inherent in the operation of rod baking. The coils of rod form a large mass of steel in compact form with large heat capacity. Moisture and lime are present, at the surface of the rod, throughout the whole mass. The presence of the water on the steel tends to develop red rust. The presence of lime affords an opportunity for the formation of marble, if carbon-dioxide is present to cause the reaction. The problem, in so far as the physical result is concerned, is to eliminate the water without the formation of red rust or marble.

In the past, there have been three types of rod baking ovens. The "direct fired" rod baking oven derives heat from the products of combustion directly from the fuel bed. Such "direct fired" rod baking ovens have a flue for the products of combustion and the wall of the flue serves as a partition through which heat is transferred by conduction to the oven chamber for baking the rods. The conventional "direct fired" rod baking oven operates to bake the rods while keeping the products of combustion out of contact with the rods. Such a device operates gradually to heat the mass of rods and, in effect, to boil off the moisture. Air circulation in the oven occurs only by virtue of natural convection currents created by the heat supplied to the chamber. The temperature in such an oven is not uniform and moisture condensation may occur. Formation of some red rust spots is common.

Other rod baking ovens are heated electrically. In such ovens, electrical resistance units are arranged in the oven chamber to radiate heat to the rods and to heat the oven atmosphere. Air circulation is by convection currents generated by the heat supplied. Such ovens operate to boil off the moisture. Some red rust is formed. The primary objection to such ovens is the cost of operation.

A third type of rod baking oven employs steam coils, in the oven chamber, to supply the heat and, as disclosed in the Cramer Patent 1,763,418, circulation of the air in the oven chamber is effected by fans. However, this is a closed circulation system, there being no renewal of the oven atmosphere by introducing fresh air and exhausting moisture laden air. The vapor in the oven atmosphere progressively increases as rod baking proceeds.

The essential characteristic common to such prior art rod baking units is that the products of combustion do not come into contact with the rods. All such indirect heating systems are expensive and slow in operation.

The rod baking ovens of the prior art have been of the closed chamber type which entail an expensive method of handling the rods. The rods coming from the lime bath, loaded on trucks, are moved into the oven until the oven is full. Then the oven is closed and the rods are baked for a considerable period of time. At the end of the baking operation, the rods are moved out of the oven by hand and the oven is ready to receive the next charge.

Obviously, there is a large time delay and much expense involved in the simple handling operation. In addition, the practice of loading the oven to capacity, and the relatively large capacity of the oven compared with the pickling to lime bath units, affords a considerable period of time, between lime bath operation on the coils first to enter the oven and the event of rod baking. The greater this time lag, the greater the opportunity for the development of red rust on the rods.

More recently, a rod baking system, disclosed in Patent 1,999,513 has been in successful commercial use. As will appear from that patent, a more efficient heating system for the oven is provided. The operation of the system disclosed in that patent is characterized by a closed type oven with the objectionable features of time delay and cost of rod handling pointed out above.

The Patent No. 1,592,946 discloses the operation of handling metal sheets from pickle bath and lime bath to the baking oven by power means. That patent discloses oven chambers maintained closed during baking, the closure for which must be opened for introduction and removal of sheets. The heating system provides movement of heated air through the oven chambers in sequence. The progressive decrease in temperature and the progressive increase in moisture content, inherent in that heating system, either causes moisture condensation or inefficient utilization of heat. Rapid baking cannot be effected except at great sacrifice of efficiency. The heating medium is discharged to atmosphere, it is not recirculated.

It is an object of this invention to effect the baking operation in a few minutes of time. It is an object to combine the rod baking operation with the pickling, rinsing, sull treatment, and lime immersion operations so that a uniform technique of handling the rods, by power equipment, may be practiced throughout all of the operations. It is an object to reduce the time of rod baking to a period so short that equipment for baking the rods, in normal quantity of production, will be small in size, comparable to the other units of the associated acid to lime bath processing equipment. Another object is to effect rod baking so rapidly that successive batches of coils of rod, of the size standard to the acid to lime bath operations, may proceed through the baking operation without accumulation of rods at the baking equipment. It is an object to provide a processing technique for treating rods, preliminary to drawing, wherein coils of rod proceed in a continuous succession of batches, from acid to lime treatments and through the baking operation, in continuous production sequence, and without substantial accumulation at any treating unit.

Economy ensues from flash baking the rods, power equipment for handling the rods to and from the baking equipment being used. This advantage is enhanced in handling the rods by power equipment used for conducting the rods through the acid to lime bath operations. Conventional equipment for that purpose operates to raise and lower pins of rod out of and into open top treating units.

It is an object of this invention to provide a rod baking oven, open at the top to permit unobstructed movement of rods into and out of the oven chamber. More broadly, it is an object to provide a rod baking oven having a chamber open at any suitable part thereof, to permit unobstructed movement of the rods into and out of the oven chamber. It is an object to provide a novel rod baking unit adapted for movement of rods into and out of the rod baking chamber with utmost facility and by use of power means.

It is an object of this invention to transfer each batch of rods immediately from the last lime bath to the baking oven and to bake that batch without waiting for transfer of the next following batch from the lime bath.

Flash baking requires the transfer of heat to the rods at a very rapid rate. This may be achieved by supplying a hot gaseous medium to the oven chamber, directed against the rods, at a high mass rate. The high rate of movement of hot gases, together with the open top oven chamber, renders it desirable to recirculate the hot gases. Other advantages afforded by recirculation of the gases will become apparent in the accompanying detailed description. It is an object of this invention to provide for heating rods by direct impingement of a hot gaseous medium, against the rods, at a high mass rate. It is an object to provide for recirculating the gaseous medium between the oven chamber and the source of heat. It is an object to provide for recirculating the hot gaseous medium through a combustion chamber.

It is an object of this invention to provide a heating system characterized by recirculation of oven atmosphere through a combustion chamber, for an open top rod baking oven. It is also an object of this invention to provide suitable means, in combination with an open oven chamber and a gas recirculating heating system, for the oven, adapted to reduce heat losses from the oven chamber while imposing no impediment to introduction and removal of rods to and from the open chamber.

It is known that acid pickling causes hydrogen occlusion in the metal, and that acid brittleness, undesirable in drawing, is a result of such occlusion. The facts as to the effect of baking upon acid brittleness seem not to be accurately known. It has been believed that a long period of baking was necessary to eliminate such acid brittleness. Whatever the theories and facts may be on this subject, actual commercial test has demonstrated that rods, baked in three minutes time by practice of this invention, pass through the drawing operation, and subsequent tests and use, without any difference, within the observation of experienced operators, as compared with drawing like rods baked for hours of time by prior art practice.

Other objects and advantages of the present invention will appear in the following detailed description taken in connection with the accompanying drawings, in which:

Figure 3 is a cross sectional view on line 3—3 of Figure 4 of the rod baking unit.

Figure 4 is a cross sectional view on line 4—4 of Figure 3 of the rod baking unit.

Figure 7 is a perspective view of a modified form of the invention.

Figure 1:
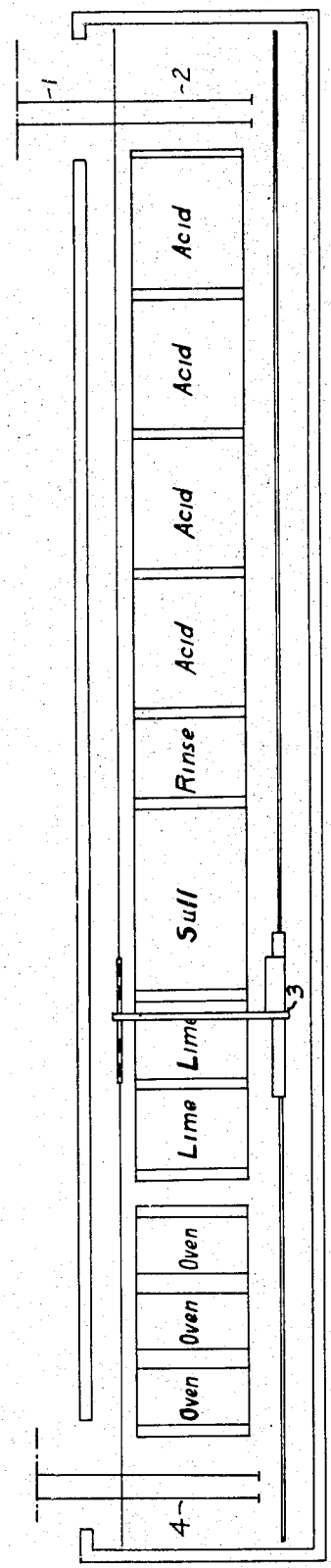
Figure 1 is a diagrammatic view showing the system of processing equipment for treating rods from the acid bath treatment to the baking operation.

Cars, loaded with coils of rod, are moved, either directly from the rolling mill or from stock, along tracks 1 to location 2. The processing equipment for treating the rods, in the particular form of the invention shown by way of illustration, is arranged in a straight line and the rods proceed from one end to the other end of the line during processing. It is also common practice to arrange the rod processing units in a circle, the rods pass around the circle as they proceed through the processing operations. This invention is applicable to either system.

Suitable power handling equipment such as a gantry crane 3 picks up a load of coils of rod on a pin, the rod coils being hung on the hook portion of the pin. A plurality of acid treating baths is provided. The operator of the crane transfers the pin of rods to an empty place in one of the acid treating baths and leaves it there. The acid loosens the scale and eliminates red rust.

Then the crane is operated to pick up another pin of rods which has been in the acid treatment sufficiently long, and transfers that pin of rods to the rinse to wash off the acid. Depending upon the type of rinsing equipment, either that pin of rods may be immediately transferred from the rinse to the sull, or that pin of rods may be left in the rinse and another pin of rods picked up from the rinse and taken to the sull. The pin of rods is left at the sull where a film of hydrated iron oxide is formed on the rods. In some instances the rods go directly from rinse to lime.

Next, another pin of rods is picked up from the sull and moved to a lime bath. There may be a series of lime baths and the pins of rods may be transferred from bath to bath by operation of the crane 3. The pins of rods are left at such lime baths for a brief time. The lime neutralizes any remaining acid and serves as a carrier for fatty materials used as lubricants in the drawing operation.

Next, a pin of rods is lifted from the last lime bath, moved to and lowered into an empty flash baking oven, and left there. As the rods come from the lime bath the surface is covered with a film of water and lime. Continued exposure of the wet rods to atmosphere develops red rust. Therefore, the rods are baked to drive off the moisture with as little time delay as practicable.

Lastly, the pin of rods which has been longest in the baking operation is picked up from the flash baking unit by the gantry crane and transferred to cars at track 4. The cars are moved to the wire drawing location. Obviously, the operation of transporting the rods to the wire drawing location may be effected by a crane such as the gantry crane 3.

The time of acid treatment is a fraction of an hour, about 30 minutes. The time for rinse is a few minutes or it may be effected merely by lowering a pin of rods into and out of the rinse chamber. The time of treatment in the sull may be longer or shorter than that for acid treatment. The lime bath treatment is a momentary dip. The flash baker of this invention operates to bake the rods in a few minutes time, say five minutes. The time required by the operator of the crane 3 for effecting the series of operations last described also is a matter of a few minutes. The operator proceeds through a cycle of operations, as described, and maintains a substantially uniform predetermined time schedule which affords adequate time for effecting the various treating operations and yet does not involve any undue delay at any treating operation. A single piece of power equipment is utilized all the time for handling of rods through the processing steps. By arranging the processing operations in a time schedule, wherein the period of treatment at each step is sufficient but not excessive, the equipment for handling a certain volume of rods is a minimum, with attendant economy. Inclusion of the baking operation in this sequence of operations affords a great economy of equipment, space, handling costs, and improves the general economy of the whole system by making it possible to maintain a coordinated time schedule from beginning to end of the rod treating operation.

Once the actual baking operation has been reduced to a period of minutes, the operations of handling the rods into and out of the flash baking ovens must be reduced to a small fraction of the baking period in order fully to realize the advantages of flash baking. For this reason, and also to adapt the flash baking ovens to the system of equipment conventional to rod processing, the flash baking ovens are provided with an open top. Provision of the open top oven chamber enables the operator of the gantry crane to lower a pin of rods into a baking oven and to lift a pin of rods from a baking oven without obstruction or delay.

Figure 2:
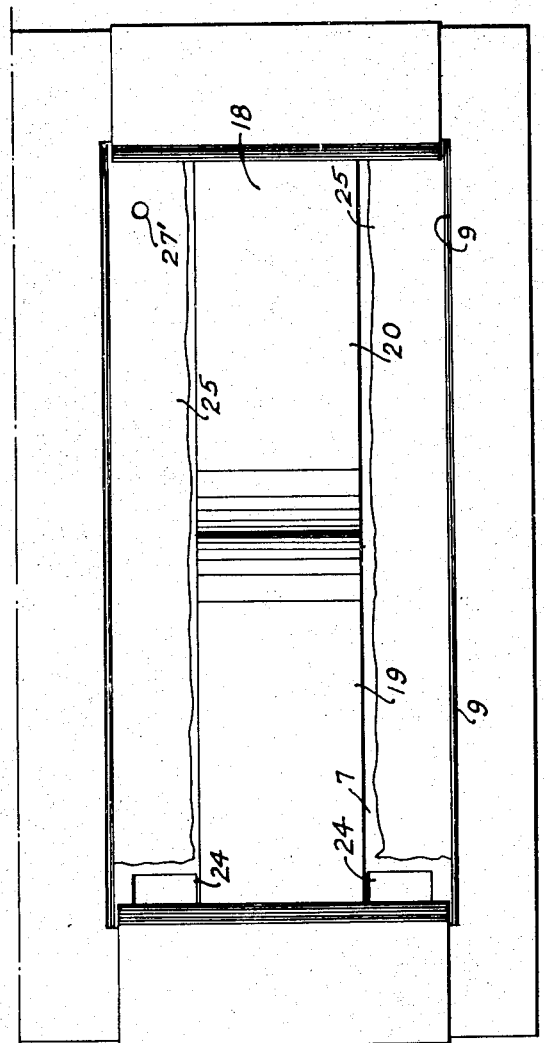
Figure 2 is a top plan view illustrating a rod baking unit of this invention.

Such an open top rod baking oven is illustrated in Figures 2, 3, and 4. The oven is supported on a suitable base 5 and consists of side and end walls 6, floor 7, and partitions 8 between adjacent oven chambers. Features of oven construction are conventional. The ovens are open at the top as indicated at 9 to permit movement of rods 10 supported upon a pin 11 into and out of the oven chamber in a vertical direction, by operation of a crane. The pin 11 has an integral I-beam provided with eyes 13 to be engaged by hooks 14 of the load bar 15 of the crane. Cables 16 extend from the load bar to the boom (not shown) of the gantry crane. Although the particular type of crane used in practicing the invention is not essential, the gantry crane has certain advantages in that the operator rides at floor level where he may grasp and manipulate the pins as they move into and out of the oven chambers. A handle 17 is provided at the end of the I-beam 12 for that purpose.

A series of open top oven chambers 18 are provided. In processing pins of rods in succession, one of the oven chambers 18 normally is empty, the other two being occupied by pins. The operator brings a new pin of rods to the empty oven chamber 18 and leaves it there. Immediately thereafter the operator removes that pin which has been baking longest thereby leaving another empty oven chamber 18. Thus, an empty oven chamber is always available to receive a new pin of rods as the cycle of handling the rods through the processing steps proceeds in the manner described before.

So far, the invention has been described in connection with open top ovens. This particular type of oven is adapted to meet with the operating characteristics of standard equipment. Other types of open ovens may be provided, adapted for use with other types of power handling equipment, such as a tunnel oven open at both ends. Such variations of the particular form of invention disclosed by way of illustration, which may be desirable to adapt the practice of this invention to other types of handling equipment, and in combination with other possible types of processing equipment which precede the baking operation, are within the purview of this invention. The provision of a flash baking operation, in combination with other treating processes, wherein the period of baking is commensurate with the period of the other treating steps, and the provision of suitable baking equipment adapted to permit movement of the rods into and out of the oven chamber at a rate and with facility such as to gain full advantage of flash baking, characterize this invention.

The rods, when introduced into the oven chamber, are coated with a film of lime and water which extends over the surface of the rods throughout the whole mass of each compact coil. The problem is presented of supplying sufficient heat to vaporize the moisture and a current of gaseous medium to conduct away the vapor at a rate such as completely to eliminate the water on the whole mass of rods in a few minutes time. Some appreciation of this problem may be had by consideration of the fact that heretofore the baking operation has required hours of time.

According to this invention both circulation of gaseous medium in a large volume and heat supply, to raise the temperature of the water and thereby to increase its vapor tension, results in the rapid elimination of the water and, due to the effect of evaporation in lowering water temperature, it tends to keep down the temperature of the water remaining on the metal and thereby to hold down the rate of reaction between air, water, and steel which forms red rust. The more dry the gaseous medium, the greater is its capacity to receive vapor and to evaporate the water. This capacity of the gaseous medium to receive the vapor is enhanced by elevating its temperature. Also, by supplying the heat to the water and rods through the gaseous medium into which evaporation occurs, that heat is largely effective to produce evaporation rather than merely to raise the temperature of the metal. Accordingly, the heat is introduced into the oven chamber by means of the flowing mass of gas which receives and conducts away the water vapor evaporated from the coils.

Baking a large mass of wet lime coated rods in a few minutes time by the use of a gaseous heating medium involves the transfer of heat from that medium to the rods at a very rapid rate. The heat, to be transferred, is distributed throughout the whole mass of the gaseous medium. The resistance to the flow of heat by conduction through gases is well known. Therefore, to get the requisite rate of heat transfer from the gaseous medium to the rods, it is essential that a very large portion of the hot gaseous medium be caused to impinge directly upon the rods.

It will be evident that a slowly moving or drifting hot gaseous medium affords actual impingement of the medium on the mass of rods in only small proportion. In such case the quantity of heat in that part of the gaseous medium which does not contact the rods is a large proportion of the total available heat and that heat is not transferred, in any appreciable quantity, to the rods, due to the thermal resistance of the intervening gaseous medium. By increasing the velocity of the gaseous medium the flow becomes turbulent, and the turbulence increases with the velocity. The highly turbulent flow of gaseous medium, directed toward the mass of rods, results in actual impingement or contact of a very large proportion of the whole mass of gaseous medium with the mass of rods. By blowing the hot gaseous medium directly against the mass of rods at a high velocity a very rapid rate of heat transfer is effected.

Suitable equipment for supplying hot gaseous medium in direct contact with the pin of rods at a high velocity is shown in the drawings. Ducts 19 and 20 lead from the fans 21. The fans 21 operate to blow hot gaseous medium through the ducts 19 and 20 and out at apertures 22 and 23 into the oven chamber. The pins for supporting the rods 10 are standard, so that rods 10 always occupy about the same position in the oven chamber. The discharge openings 22 and 23 are located so that hot gaseous medium issuing therefrom flows directly against the mass of rods 10. While the particular arrangement of the outlets 22 and 23 and ducts 19 and 20 may be varied, it is suitable to arrange them so that the issuing hot gaseous medium is blown axially into the mass of rods in coil form, supported on the pin 11. The turbulent effect is further enhanced by arranging the outlets 22 and 23 at opposite ends of the passage through the series of coils of rod 10. The rapidly flowing streams of gaseous medium issuing from the apertures 22 and 23 meet in the central region of the coils of rod. Great turbulence ensures and the flowing masses of gases are discharged laterally through the mass of coiled rods. This insures penetration of the hot gaseous medium throughout the whole mass of rods. Thus good heat transfer from the hot gaseous medium to the mass of rods is obtained.

While the supply of heat to the mass of rods at a rapid rate is necessary to obtain flash baking, the rapid removal of the water vapor evolved is an equally important contributing factor to the rate of baking. The rapid movement of large masses of gaseous medium over the rods and through the interstices within the mass of rods, carries the water vapor away. The high temperature of the gaseous medium provides adequate capacity, in the gaseous medium, for absorbing the water vapor.

High temperature, very rapid heat transfer, rapid flow of gaseous medium through all the interstices and over all the surfaces of the mass of rods, and the great capacity of the gaseous medium to absorb water vapor, all taken together, are factors which make it possible to bake a compact mass of rods in coil form, with a film of lime and water permeating the whole mass, in a few minutes time. The simple arrangement for bringing the hot gaseous medium, at a high velocity, into complete contact with a compact mass of rods, as shown in the drawings, is both inexpensive in construction and highly effective in operation.

If desired, the duct system might be arranged so that the hot gaseous medium would be discharged against the sides of the coils through to the interior. Other suitable arrangements will be within the skill of one versed in the art.

The arrangement of the coils of rod in the oven chamber is a factor in the rate of baking. The convolutions of wire in the coils are loose and each coil is supported separately from the others. When hung from the pin, as shown in the drawings, the weight of the coil causes the turns to pack together over the pin and, at the lower part of the coils, the turns of rod hang loosely and apart, in substantial degree. As the pin of rods is lifted from the hot lime bath, the excess lime water drains from the top of the coils downward. Natural drainage aids water elimination at the top of the coils where the rod is packed most tightly and where the interstices are least accessible to the hot gaseous medium. The coils are wettest at the lower parts where packing of the rods is least and the interstices are most accessible to the hot gaseous medium. As will be described subsequently, the gaseous medium flows downwardly through the oven chamber, in the main, although the invention is not confined to any particular direction of flow. This downward flow of gaseous medium tends to provide a predominant baking effect at the lower portions of the coils where the moisture is the greatest. These effects are contrary to conventional practice, where the coils of rod lie on a truck and upon one another, with natural drainage of water to the most closely packed and inaccessible portions of the rods.

The hot gaseous medium passes over and through the mass of rods at high velocity. Heat is transferred to the rods and moisture is removed in large quantity and at high rate. To obtain the desired rate of baking the hot gaseous medium is introduced at a temperature in the region of 700° F. The gaseous medium leaving the mass of rods may have a temperature in the region of 300° F. This temperature is well above the dew point so that moisture condensation does not occur.

If desired, the used gaseous medium, leaving the rods may be discharged to atmosphere or to some suitable device for recovering the heat remaining therein. Those aspects of this invention not directly concerned with the manner of heat supply to the gaseous medium are not limited to any particular disposal of the spent gaseous medium.

The large mass of gaseous medium at the spent temperature contains much heat. Gaseous medium, to be heated, must be obtained from some source. Economy results from using the spent gaseous medium as the major source.

Accordingly, the gaseous medium leaving the mass of rods is recirculated. Any suitable duct system, or system of passages, may be provided in combination with the oven for returning the gaseous medium to the source of heat supply and back to the fan 21. Other than convenience of construction, the chief factor determining the arrangement of the return ducts or passages largely is the presence and the location of the opening into the oven chamber through which the rods are introduced and removed without obstruction. The form of the invention shown involves an oven chamber open at the top and the return system for the gaseous medium is located at the bottom of the chamber. In case of oven construction provided with differently arranged openings for free access to the interior of the oven chamber, the return system for the gaseous medium may be located to best advantage as determined by the features of such alternative oven construction.

As shown in Figures 3 and 4, the floor 7 of the oven chamber is provided with one or more passages 24 through which the returning gaseous medium may discharge from the oven chamber into the combustion chamber. By so locating the discharge passage the flow of gaseous medium through the oven chamber is in a general downward direction away from the oven top, which movement of gaseous medium tends to avoid loss of the hot gases through the open top of the oven chamber. Plates 25 are arranged across the lower portion of the oven chambers 18 and serve to retard the downward flow of the gaseous medium, preventing concentration of the gas flow into streams and affording some back pressure. This aids in obtaining a more uniform movement of hot gaseous medium through the mass of rods in coil form. The plates 25 are provided with openings 26 along the margins thereof for permitting the return flow of gaseous medium therethrough. While these effects upon the return flow of the gaseous medium are beneficial, they are not essential and do not constitute the main purpose of the plates 25. The plates 25 primarily are provided to catch moisture dripping from the coils of rod when first introduced into the oven chamber. The plates 25 are tilted as shown in Figure 4 and are provided with a drain system 27' which carries away water that drips upon the plates.

The returning gaseous medium passes in heat exchange relation with the source of heat supply and back to the intake 27 of the fan 21. Suction maintained at the intake side 27 of the fan 21 and the pressure of the gaseous medium at the discharge apertures 22 and 23 maintains a pressure gradient from the central region of the oven chamber, where the mass of rods is disposed, to the passages 24. This pressure gradient maintains the return flow of the gaseous medium.

In order to achieve the rapid rate of rod baking which is an object of this invention, the rate of gas movement and the rate of heat supply, in relation to the size of the oven chamber is very large. The rate of flow of the gaseous medium through an oven chamber, of a size conveniently to receive a pin of rods, is such as to afford a complete change of oven atmosphere at a rate which approximates 20 times per minute. This rate, which has been found effective in commercial practice, may be varied considerably, either to increase or to decrease the rate. Also, by virtue of the large mass of hot gases flowing through the oven chamber and by reason of a relatively high gas temperature, heat is supplied to such an oven chamber for baking a single pin of rods at a rate approximating one and one-half to two million B. t. u. per hour. The rate of heat supply also may be varied either to increase it or decrease it. It will be obvious to those skilled in the art that variations in the rate of gaseous movement and the rate of heat supply determine the period of baking. Those factors are adjusted to values suitable for obtaining a rate of baking determined by the other operating factors incident to the whole technique of processing rods preparatory to drawing them.

The large volume of heat, and the rapid rate of heat exchange from the source of heat, necessary to maintain the temperature of the rapidly moving mass of gaseous medium, makes the problem of supplying the heat initially an important factor in the rod baking system. In the broader aspects of the invention, the heat may be supplied by any suitable form of heat exchanger. Steam coils may be used. Transfer through a partition directly from a combustion chamber may be practiced. Electrically operated heating devices may be utilized. The technique of and structure for flash baking, as described before, is not necessarily confined to any particular form of original heat supply.

While the invention is not limited to any particular type of initial heat supply, the open flame combustion chamber through which the oven atmosphere is recirculated, the products of combustion mixing with the oven atmosphere, constitute a source of heat supply which is adapted for effecting flash baking for reasons which will appear. A combustion chamber is indicated at 28. Combustion is maintained in the chamber 28 in the form of a stationary flame of any suitable fuel, gas and oil being satisfactory. Either an oil spray or vaporized oil may be used. Some forms of powdered solid fuel may be used. Natural gas has proven highly satisfactory. It is desirable to provide a fuel the combustion of which, in a stationary flame, may be controlled readily by regulating the volume of incoming fuel. A thermostat (not shown) may be provided at the discharge side of the fan 21 to operate an automatic control for regulating the fuel supply to maintain a predetermined temperature at the fan outlet. This control is a well known and conventional one and serves to maintain a supply of hot gaseous medium at a predetermined temperature without permitting such over-heating as would damage the fan or other parts of the system.

The oven atmosphere returning through passages 24 enters the combustion chamber 28 and is heated by mixture with the hot products of combustion. The fan 21 is arranged in the housing 29 of the combustion chamber and the fan housing is provided with inlet apertures 27 at both sides of the fan impeller. The hot gaseous medium, containing the products of combustion, is drawn into the fan housing at apertures 27 and discharged through the ducts 19 and 20 to the oven chamber. Electric motor 30 drives the fan impeller through a belt 31 trained over sheaves on the motor shaft and the impeller shaft.

The products of combustion contain carbon-dioxide and water vapor. Under conditions and operations of prior art practices explained hereinbefore, contact of the products of combustion with the rods being baked always has been avoided. Carbon-dioxide tends to react with the lime to form limestone. The water vapor from the products of combustion impairs the capacity of the oven atmosphere to absorb water vapor from the wet rods. If the temperature drop be great enough, in the oven chamber, the water vapor from the products of combustion promotes condensation of moisture.

In the practice of this invention, a very large proportion of fresh air, relative to fuel, continually is introduced into the recirculating gaseous medium. Consequently, the proportion of carbon-dioxide, from the products of combustion, to the whole gaseous medium, is small, in the neighborhood of 3% to 1% or less. Such dilution of the carbon-dioxide avoids the formation of any appreciable amount of limestone by reaction with the lime. Also, the high mass velocity of the gaseous medium over the mass of rods maintains the temperature drop of the spent gaseous medium well above dew point. The high temperature of the gaseous medium affords a water vapor absorbing capacity, in the gaseous medium in contact with the mass of rods, so great that the effect of water vapor from the products of combustion, in retarding absorption of water vapor from the wet rods, is rendered negligible.

Still another factor arises in connection with the use of the open flame combustion chamber through which the oven atmosphere is recirculated, which is of advantage in flash baking. In order to maintain combustion some fresh air must be introduced continuously into the combustion chamber. Also, for practical reasons, it is desirable to introduce some cool, fresh air into the intake of the fan, to cool the bearings. This continual replenishment of the fresh air in the oven atmosphere prevents the accumulation of water vapor in the oven atmosphere. Sufficient gaseous medium continuously is discharged from the heating system to accommodate the incoming fresh air. Since the oven chamber is open at the top this discharge of gaseous medium occurs out through the open top. The gaseous medium discharging through the open top carries with it the water vapor that is absorbed from the rods. It is to be expected that some fresh air will be entrained from the upper portion of the oven chamber and mixed with the hot gaseous medium. This effect further minimizes any tendency toward accumulation of water vapor in the oven atmosphere. Due to these various factors, water vapor content is kept low.

The greatest advantage of the open flame combustion chamber, through which the oven atmosphere is recirculated, is its economy. With such a very large supply of heat required at such a rapid rate, the open flame combustion chamber through which the oven atmosphere recirculates, is the only form of adequate heating system, which is of a size commensurate to the oven chamber. The practical difficulty of heat transfer through a partition from a combustion chamber would make it necessary to provide a heat exchanger which would be incongruously large as compared to the oven chamber. Moreover, the open flame combustion chamber through which the oven atmosphere recirculates has advantages of heat transfer to the gaseous medium superior to that of any other form of heating device. This is due to the fact that the heat is supplied to the gaseous medium by mixing the products of combustion directly with the medium.

To improve upon the economy of operation of the open top oven, it is desirable to provide means to curtain or screen the upper portion of the oven chamber so as to minimize loss of the hot gaseous medium to the atmosphere. An air curtain is one suitable device for that purpose which does not obstruct movement of the rods into and out of the oven chamber. As shown in Figures 3 and 4, a fan 31' is provided which has an air inlet 32 open to the atmosphere. The fan is driven by motor 33, through belt 34 trained over pulleys on the motor shaft and fan impeller shaft. The fan 31' discharges into the duct 35 which extends beneath the floor of the oven chamber to the ends of the oven. At its ends the duct 35 connects with the ducts 36 which extend upwardly through the floor of the oven chamber and along the side wall thereof. At the upper ends, ducts 36 join with ducts 37 which extend horizontally along the oven wall from end to end of the oven chamber. Each of the ducts 37 is provided with a nozzle 38 extending lengthwise of the duct and disposed so as to direct the discharging air in a thin broad stream across the open top. The two air jets meet at the central portion of the top of the oven chamber, and the air discharges to atmosphere. These air curtains substantially aid in reducing the loss of hot gaseous medium to the atmosphere.

The air curtain is a desirable feature although not essential. By providing a deep oven chamber and disposing the ducts and passages so as to minimize flow of hot gaseous medium in upward direction, satisfactory economy of operation may be attained without the air curtain.

As explained before in this description, one or another of the oven chambers 18 is empty most of the time. For economy, it is desirable to shut off the heating unit for the empty oven. As explained before, the operator of a gantry crane rides along at floor level adjacent to the processing units. The operator may turn the heating units for the rod baking ovens on and off as rods are lowered into and removed from oven chambers. However, it is convenient and desirable to provide an automatic means for controlling the oven heating system incident to moving the rods into and out of the oven chambers.

Figure 5:
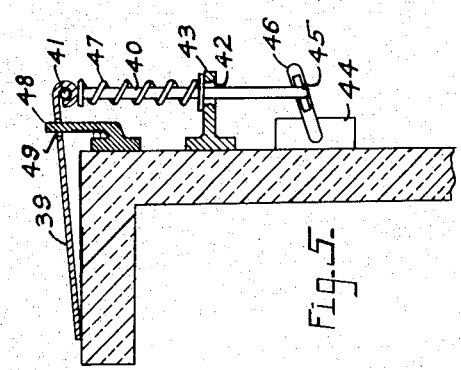
Figure 5 is a detail view illustrating a feature of automatic control.

As shown in Figure 5, a flipper plate 39 is arranged along the top of the side wall of the oven. The plate is located in a position to be engaged by the I-beam of the pin when a pin of rods is lowered into the oven chamber. Rod 40 is pivoted to the edge of the flipper plate as indicated at 41. The rod 40 extends through an aperture 42 in bracket 43 attached to the wall of the oven. A switch 44 is located adjacent to the end of the rod 40. A loose pivotal connection 45 is provided between the end of the rod 40 and the switch handle 46. A coil spring 47 is arranged around the rod 40 and engages the plate 39 at one end and with the bracket 43 at the other end. When there is no load on the flipper plate, the spring urges it upwardly lifting the rod upward to actuate the switch to open position, thereby actuating an electric control circuit to reduce the supply of fuel. If desired, the motors for driving the fans associated with the oven may be stopped too. When a pin of rods is lowered into the oven chamber the one end of the I-beam comes to rest on top of the flipper plate and presses it downwardly against the action of the spring. The resulting movement of the rod 40 actuates the switch lever to close the electrical circuit to set the oven heating system into operation. Pins 48 are attached to the oven wall and extend through apertures 49 in the flipper plate to guide the flipper plate and to prevent it from dislocation. The inner edge of the flipper plate 39 rests freely on the top of the oven wall.

Figure 6:
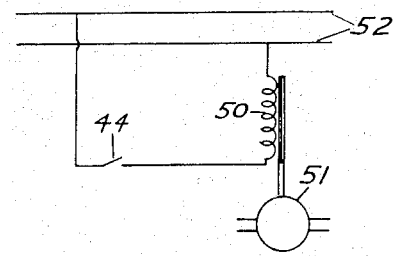
Figure 6 is a diagrammatic view of the control circuit.

Figure 6 shows a circuit diagram associated with the automatic control device of Figure 5. The switch 44 is in series with the coils 50 of a solenoid for operating valve 51 in the fuel line. Switch 44 and solenoid coil 50 are connected across electrical power mains 52. When the switch 44 opens, the valve 51, which is biased toward closed position, operates to restrict the flow of fuel to the desired minimum. When the switch 44 is closed, solenoid 50 is energized to open the valve 51 to operating position. The fuel supply is increased to that needed for baking the rods. The solenoid valve is of a standard design in common use.

Figure 7 is another illustration of the invention, there being certain detail differences from the form before described. Fuel and primary air are introduced through inlets 60, combustion taking place in the burners 61. Secondary air is supplied through intake 62 opening into the combustion chamber 63. The recirculating gaseous medium from the oven enters the combustion chamber through opening 64 in the floor of the oven chamber. Two openings 64 are provided, symmetrically placed relative to the center line of combustion chamber. The hot gaseous medium, products of combustion and excess fresh air flow through the combustion chamber 63, around partition 65 and into openings (not shown) in the sides of the fan housing 66. Fan impeller 67 rotates in the housing 66 and is driven by an electrical motor (not shown). The hot gaseous medium discharges from the fan housing 66 along ducts 68 which lead to the discharge openings 69. Openings 69 are located in register with the opening through a series of coaxially arranged coils of rod supported in the oven chamber on a pin such as indicated at 70.

A sheet metal false bottom 71 extends across the lower portion of the oven chamber to catch dripping lime water which discharges through a drain 72 and is carried away by suitable conduits (not shown).

A fan housing 73 is supported on suitable framework and is provided with openings 74 through which air at atmospheric temperature enters the fan housing. A fan impeller 75 is mounted for rotation in the housing and is driven by an electrical motor (not shown). The fan housing connects with ducts 76 which extend along the side walls of the oven chamber as indicated at 77. Ducts 76 open into passages 78 afforded by sheet metal channels 79 extending along the side walls and along the end walls of the oven chamber at the top margins thereof. A cover plate 80, supported on the top of the oven walls, extends over and forms a partial closure for the channels 79. The channels 79 are provided with lips 81 which are slightly spaced from the inner margin of the cover plate 80 to afford a slot 82 through which the air may discharge in a thin broad stream across the top of the oven chamber. This air curtain issues from the passages 78 from both sides and both ends of the oven chamber.

The lips 81 have depending portions 83 along the side wall of the oven chamber and depending portions 84 along the end walls of the oven chamber. The portions 83 and 84 serve as guards for the channels 79 and for the ducts 68 to prevent damage by a swaying pin of rods as it moves into and out of the oven chamber. The ducts 68, at the openings 69, register with apertures in the portions 84. The portions 84 and the ducts 68 may be welded together at the registering openings. It will be observed that the discharge openings 69 are circular, instead of rectangular as shown in other figures. The circular openings 69 conform to the shape of the openings through the coils of rod hanging from the pin.

Figure 8:
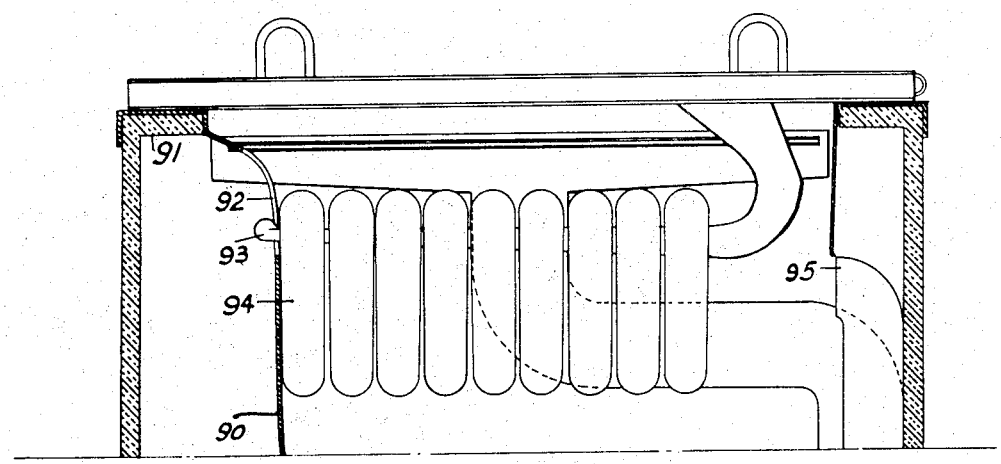
Figure 8 is a fragmentary view in section and elevation of another modification.

Figure 8 discloses another modification of the invention. The device of Figure 8 is like that of Figures 1 to 4 in all respects except one. In the device of Figure 8, a baffle 90 extends downwardly from the top portion 91 of the oven wall. The baffle 90 is provided with a slot 92 arranged to receive the end 93 of the pin, extending through the baffle. The slot allows free movement of the pin in a vertical direction, when the pin is moving into or out of the oven chamber. When a pin of rods is in baking position in the oven chamber, the baffle 90 engages with the side of the end coil 94 on the pin and closes the passage through the several coils of rod, at that end. A duct 95, similar in all respects to the duct 20 of Figure 3, is provided for directing the flow of hot gaseous medium into the passage within the coils of rods. Only one duct is provided for supplying the hot gaseous medium, there being no duct at the end where the baffle 90 closes the passage. In operation, the hot gaseous medium discharges axially into the coils hanging from the pin end and being prevented from discharging from the other end of the passage by the baffle 90, it is forced to discharge laterally through the mass of rods. Thus, movement of the hot gaseous medium from the interior of the coils in a general radial direction outwardly through the mass of rods is achieved while introducing the hot gaseous medium into one end only of the passage through the coils. In all other respects the form of the invention shown in Figure 8 is like that shown in Figures 1 to 4.

The particular forms of the invention disclosed by way of illustration have a separate heating system for each oven. The volume of heat required for flash baking makes it desirable and practical to use separate heating units for each oven. However, if desired, a single heating system for a plurality of rod baking ovens may be provided. In that case, suitable control valves may be provided for shutting off one or more of the oven chambers from the gas circulating system while such oven chamber is empty.

In the routine of the processing schedule, as described before, the operator advances a pin of rods from one unit to the next in succession. He begins at the acid bath end and proceeds to the other end of the system, transferring pins from unit to unit as he goes, finally transferring a pin from the flash baking unit to a car or other means for carrying the treated rods away. This schedule requires a certain approximate period of time, about three to five minutes. The time for processing at each unit is known, and units are provided of sufficient capacity to carry a bank of pins such as to allow sufficient treatment time while receiving and discharging pins every few minutes. Thus, for thirty minutes acid treatment and a three minute schedule, capacity for eleven, or more pins is provided, an empty place being left to receive the next pin. On such a schedule, a flash baking unit having a five minute baking time should have three oven chambers, two being full all the time and the third empty between crane departure and next arrival at the baking unit. The empty baking oven is shut off between baking operations. By such coordination between the rate of baking and the crane schedule, the rods are left in the ovens only such time as is necessary to effect baking and, since the oven is shut off at other times, economy is achieved. Also, economy appears in the form of smaller investment in equipment and building, and in overhead, as compared to prior practice. Commercial test has demonstrated that the fuel consumption, per ton of rods baked, is very low, comparable to or less than that obtained by the practice of the invention of Patent 1,999,-513, which afforded the most economical operation hitherto known.

Some mills produce lime coated, baked rods for sale. These rods usually have an extra heavy lime coat. It is common to build up the heavy coat by repeated dipping in the hot lime bath. Natural drainage interferes with lime accumulation at the lower portions of rods hanging from a pin, successive coats being washed off leaving the effect of a single coat. The flash baking unit can be used to overcome this difficulty. The pin of rods raised from the lime bath is transferred at once to the flash baking oven, before drainage has proceeded far. The pin of rods is left in the oven momentarily, i. e. a very short time; it may be dipped in and lifted out at once. The lime coat is partially baked, enough to set the first coat. Then the pin of rods is again dipped into the lime bath, and again baked. Since the rods are hot, from the baking operation, they are lowered into and raised out of the hot lime without detaching the crane from the pin. Repeated lime immersion and momentary baking is continued until a heavy lime coat is built up and completely baked. The lime coat is soft and silky, no crust forming.

The rod baking oven disclosed herein is intended to operate at a high baking rate and to bake the rods in a period of time which is a small fraction of the time ordinarily required for rod baking by prior art methods. Baking in less than fifteen minutes is practicable. Such high rate of rod baking is effected by maintaining a large volume of hot evaporating medium, passing into contact with the rods at high velocity, and by a high rate of turnover of the oven atmosphere. By so reducing the time of rod baking, the period of rod baking becomes comparable with the period of time for pickling and lime bath treatments. By processing a single batch of rods as a series of consecutive operations upon a single batch it becomes practicable to handle the rods more efficiently, in a continuous production process, and by the use of power equipment for effecting the handling operations, with consequent economy in production cost. This process may be practiced either by equipment such as described herein or by other suitable equipment such as, for example, as by use of the continuous conveyor operating to move the rods in sequence through the pickling bath, through the lime bath, and through an open ended tunnel type of rod baking oven.

The invention has been described with reference to preparing rods for drawing. The equipment and technique is useful for processing other forms of steel, for various purposes, and for treating rods for purposes other than drawing. Such uses, and variations in structure and technique disclosed, within the skill of one versed in the art, necessary to adaptation, are within the purview of this invention.

The invention has been described in detail by way of illustration. It is not intended so to limit the invention. It will be obvious to one skilled in the art that variations in the details of construction and the technique of processing may be practiced without departing from the scope of the invention defined in the following claims.

What we claim for our invention is as follows:

1. In combination, a rod carrier adapted to engage and to support coils of rod, an oven having a chamber permanently open at the top for unobstructed movement of rods supported by said carrier, into and out of the chamber, said carrier being adapted to extend across and engage the top of the oven for supporting the carrier with the rods on the carrier in baking position within the oven, a combustion chamber, a duct system for conducting gaseous medium in a circuit from the combustion chamber to the oven chamber and from the oven chamber back to the combustion chamber, means for maintaining the recirculating flow of gaseous medium, means for maintaining combustion in the combustion chamber, the products of combustion being part of the recirculating gaseous medium.

2. In combination, a pin for supporting coils of rod and adapted for transportation of the rods, an oven having a chamber permanently open at the top for free movement of pin-supported coils of rod into and out of the chamber in substantially vertical direction, said pin being adapted to extend across and to engage the top of the oven with the coils of rod on the pin in baking position within the oven, a combustion chamber, a conduit having an outlet in the upper portion of said oven chamber for conducting a gaseous medium from the combustion chamber to the oven chamber, a floor formed to define a return inlet for conducting said gaseous medium from the oven chamber to the combustion chamber, the flow of the gaseous medium in the oven chamber being in a general direction away from the open top of the oven, the coils of rod being arranged in juxtaposition with said conduit outlet, means for maintaining the recirculating flow of gaseous medium, means for maintaining combustion in the combustion chamber, the products of combustion being part of the gaseous medium.

3. In combination, a pin for engaging and supporting coils of rod, the coils having openings therethrough, the coils each hanging freely and separately from the pin in substantially coaxial arrangement, an oven having a chamber open at the top for free movement of the pin and the coils of rod carried thereon into and out of the chamber, means for supporting said pin so as to position the rod in the oven for baking, and baking means combined with the oven for baking the rod, said baking means operating to direct a stream of hot gaseous medium into the space within the coils.

4. In combination, a pin for engaging and supporting coils of rod, said pin being engageable by a crane for handling the rod, an oven having a chamber open at the top, the opening being of a size to pass an oven capacity charge, said oven being constructed and arranged for unobstructed movement of pin-supported coils of rod into and out of the chamber through said open top, said pin extending across and resting on the top of the oven with the coils of rod in baking position within the oven chamber, and means for subjecting the coils of rod to impingement of the hot gaseous medium flowing at high mass velocity, said means including a recirculating duct system arranged to direct the flow of hot gaseous medium through the central opening in the coils then through the oven chamber in a general direction away from the open top of the oven.

5. In combination, a pin for engaging and supporting coils of rod, the coils having openings therethrough said pin being constructed for engagement by power means for handling and transporting the coils of rod, an oven having a chamber open at the top for free movement of coils of rod into and out of the open oven chamber, said coils of rod being supported by said pin in freely hanging substantial coaxial relation and being movable into and out of the oven chamber by operation of the power means, means engageable with the pin to support the pin and coils of rod in baking position for the duration of the baking operation, and baking means combined with the oven for baking the rod and operating to direct a stream of hot gaseous medium into the region within the coils.

6. In combination, a pin for engaging and supporting coils of rod, said pin being engageable by a crane for handling the coils of rod, an oven having a chamber permanently open at the top, said oven being constructed and arranged for unobstructed movement of pin-supported coils of rod into and out of the chamber through said open top, means for receiving and supporting the pin with the coils of rod in baking position within the oven chamber, and means including a duct system and heating unit for directing hot gaseous medium at high mass velocity into direct impingement with the coils of rods, through the interstices of the coils, and in a return circuit from the coils to the heating unit in a direction away from the open top for baking the rods.

7. In combination, a pin for engaging and supporting coils of rod, said pin being engageable by a crane for handling the rods, an oven having a chamber open at the top, said oven being constructed and arranged for unobstructed movement of pin-supported coils of rod into and out of the chamber through said open top, means for receiving and supporting the pin with the coils of rod in baking position within the oven chamber, and means for subjecting the coils of rod to impingment of hot gaseous medium flowing at high mass velocity, and means for providing a curtain of flowing air across the open top arranged to obstruct loss of hot gaseous medium from the oven chamber to atmosphere.

8. A rod baking unit comprising an oven having a chamber open at the top, a combustion chamber, a duct system for circulating gaseous medium from the combustion chamber to the oven chamber and back from the oven chamber to the combustion chamber, means for maintaining recirculation of the gaseous medium, means for maintaining combustion in the combustion chamber, the products of combustion being part of the gaseous medium, and means for providing a curtain of flowing air in the vicinity of the open top, said curtain of air being arranged to obstruct loss of gaseous medium from the oven chamber to atmosphere.

9. In combination, a plurality of pins, each pin consisting of a supporting beam and a hook portion depending from and fixed to the beam, each pin being adapted to pick up and to carry one or more coils of rod encircling and hanging on the hook portion in side-by-side substantially coaxial relation, said coils of rod being saturated with lime water, a conveying means for transporting said pins one at a time, a plurality of rod baking ovens arranged in juxtaposed side-by-side relation in the direction of travel of said conveying means, there being a chamber in each oven, each chamber being open at the top for receiving one pin at a time with the supporting beam extending across and resting on top of the oven with the hook portion and coil or coils of rod hanging thereon depending from said beam into the oven chamber in baking position, a baking means combined with each oven for recirculating a current of hot gaseous medium through the oven chamber and into intimate contact with the coil or coils of rods in the oven chamber, pressure means combined with each baking oven and arranged to be actuated by engagement with the supporting beam resting thereon, said pressure means acting to accelerate operation of the baking means upon lowering a pin and coil or coils of rod hanging thereon into rod baking position, said pressure means acting to retard operation of the baking means upon removal of the pin and coil or coils of rod from the oven chamber at the end of the baking operation, said conveying means being operable to convey said pins carrying a coil or coils of rod to be baked one at a time to any empty baking oven, to leave each pin at an oven for the duration of the baking period, and to remove each pin from an oven at the completion of the baking operation.

10. In apparatus for baking coils of rods, the combination of an open top oven, means for supporting a plurality of coils of rods in side-by-side substantially coaxial arrangement, the axis of the coils being substantially horizontal, ducts having outlets for directing a gaseous medium axially into said coils, heating means, and circulating means for withdrawing said medium from points in said oven below said openings, through said heating means, and then returning the medium through said ducts.

11. In apparatus for baking coils of rods, the combination of an open top oven, means for supporting a plurality of coils of rods in side-by-side substantially coaxial arrangement, the axis of the coils being substantially horizontal, ducts having outlets for directing a gaseous medium axially into both ends of the passage defined by the coaxial coils, heating means, and circulating means for withdrawing said medium from points in said oven below said openings, through said heating means, and then returning the medium through said ducts.

12. In apparatus for baking coils of rods, the combination of an open top oven, means for supporting a plurality of coils of rods in side-by-side substantially coaxial arrangement, the axis of the coils being substantially horizontal, ducts having an outlet for directing a gaseous meduim axially into one end of the passage defined by the coaxial coils, means for substantially closing the other end of said passage against discharge of gaseous medium, heating means, and circulating means for withdrawing said medium from points in said oven below said openings, through said heating means, and then returning the medium through said ducts.

KENNETH B. LEWIS.
JOHN R. MORRISON.